United States Patent
Tsuyunashi et al.

(10) Patent No.: US 9,505,305 B2
(45) Date of Patent: Nov. 29, 2016

(54) VEHICLE DEVICE

(71) Applicant: FUJITSU TEN LIMITED, Kobe-shi, Hyogo (JP)

(72) Inventors: Masashi Tsuyunashi, Kobe (JP); Toshitaka Yamato, Kobe (JP)

(73) Assignee: FUJITSU TEN LIMITED, Kobe (JP)

( * ) Notice: Subject to any disclaimer, the term of this patent is extended or adjusted under 35 U.S.C. 154(b) by 0 days.

(21) Appl. No.: 14/660,131

(22) Filed: Mar. 17, 2015

(65) Prior Publication Data

US 2015/0274178 A1    Oct. 1, 2015

(30) Foreign Application Priority Data

Mar. 25, 2014  (JP) .................. 2014-061655

(51) Int. Cl.
| | | |
|---|---|---|
| *B60W 50/10* | (2012.01) | |
| *B60K 35/00* | (2006.01) | |
| *B60W 30/09* | (2012.01) | |
| *B60W 30/095* | (2012.01) | |

(52) U.S. Cl.
CPC .............. *B60K 35/00* (2013.01); *B60W 30/09* (2013.01); *B60W 30/095* (2013.01); *B60K 2350/2013* (2013.01); *B60K 2350/2052* (2013.01); *B60W 2540/04* (2013.01)

(58) Field of Classification Search
CPC .............. B60W 50/10; B60W 35/00; B60W 2420/42; B60W 2720/00; B60W 2540/04
See application file for complete search history.

(56) References Cited

U.S. PATENT DOCUMENTS

| | | | |
|---|---|---|---|
| 2001/0020933 A1* | 9/2001 | Maggioni | G06F 3/0428 345/156 |
| 2010/0289632 A1* | 11/2010 | Seder | G01S 13/723 340/436 |
| 2014/0071285 A1* | 3/2014 | Schofield | G06K 9/00818 348/148 |

FOREIGN PATENT DOCUMENTS

| | | | |
|---|---|---|---|
| JP | 2005-135037 A | 5/2005 | |
| JP | 2006-215642 A | 8/2006 | |
| JP | 2008-305096 A | 12/2008 | |
| JP | 2009-277021 A | 11/2009 | |
| JP | 2010-059820 A | 3/2010 | |
| JP | 2011-198247 A | 10/2011 | |

* cited by examiner

*Primary Examiner* — Yuen Wong
(74) *Attorney, Agent, or Firm* — Oliff PLC (57) ABSTRACT

A vehicle device includes a controller configured to: receive a signal indicative of a travelling environment of the vehicle; and output a display signal to a display device to instruct the display device to display a mark at a position in the vehicle where safety should be confirmed by a driver of the vehicle, the display signal being output in accordance with the travelling environment. Accordingly, it is possible to prompt a user to confirm the safety at suitable positions and at proper timing.

12 Claims, 6 Drawing Sheets

VEHICLE DEVICE

BACKGROUND OF THE INVENTION

Field of the Invention

The present invention relates to a technique of presenting information to the inside of a vehicle.

Description of the Background Art

A technique of determining whether a driver has confirmed the safety by detecting a movement and a line of sight of the driver by a car cabin camera is hitherto known. When the driver does not confirm the safety, the safety of travelling is ensured by making an accelerator pedal inoperative.

However, drivers, particularly beginners of driving, are not always able to confirm the safety smoothly at suitable positions and at proper timing. In such case, there arises a problem that the safety of travelling may be reduced instead of ensuring the safety when making the accelerator pedal inoperative.

SUMMARY OF THE INVENTION

According to an aspect of the invention, a vehicle device which is used in a vehicle includes a controller configured to: receive a signal indicative of a travelling environment of the vehicle; output a display signal to a display device to instruct the display device to display a mark at a position in the vehicle where safety should be confirmed by a driver of the vehicle, the display signal being output in accordance with the travelling environment; detect a behavior of the driver of the vehicle in response to the display of the mark; and control the vehicle based on the detected behavior of the driver of the vehicle.

According to the above, the mark is displayed at the position where the safety should be confirmed in the vehicle in accordance with the travelling environment, and the vehicle is controlled based on the behavior of the driver with respect to the displayed mark, therefore, it is possible to allow the vehicle to travel safely.

According to another aspect of the invention, a vehicle device which is used in a vehicle includes a controller configured to: receive a signal indicative of a travelling environment of the vehicle; output a display signal to a display device to instruct the display device to display a mark at a position in the vehicle where safety should be confirmed by a driver of the vehicle, the display signal being output in accordance with the travelling environment; detect a behavior of the driver of the vehicle in response to the display of the mark; and control the vehicle based on the detected behavior of the driver of the vehicle. The vehicle is operable in an autonomous travelling mode in which the vehicle is allowed to autonomously travel, and the travelling environment is a travelling environment in which the autonomous travelling of the vehicle is to be cancelled while the vehicle is operating in the autonomous travelling mode.

Accordingly, the mark is displayed at the position where the safety should be confirmed when the autonomous travelling is to be cancelled, and the vehicle is controlled based on the behavior of the driver with respect to the mark, therefore, it is possible to cancel the autonomous travelling safely.

According to another aspect of the invention, a vehicle device which is used in a vehicle includes a controller configured to: receive a signal indicative of a travelling environment of the vehicle; output a display signal to a display device to instruct the display device to display a mark at a position in the vehicle where safety should be confirmed by a driver of the vehicle, the display signal being output in accordance with the travelling environment; detect a behavior of the driver of the vehicle in response to the display of the mark; and control the vehicle based on the detected behavior of the driver of the vehicle. The behavior of the driver of the vehicle which is detected by the controller is a movement of the driver to point at the displayed mark.

According to the above, the movement of pointing by the driver is detected, therefore, it is possible to detect whether the driver has confirmed positive safety confirmation or not and to appropriately control the vehicle.

Therefore, an object of the invention is to provide a technique of prompting safety confirmation at suitable positions and at proper timing.

These and other objects, features, aspects and advantages of the present invention will become more apparent from the following detailed description of the present invention when taken in conjunction with the accompanying drawings.

DESCRIPTION OF THE EMBODIMENTS

Hereinafter, an embodiment of the invention will be explained with reference to the drawings.

1. First Embodiment

1-1. Outline

Figure 1:
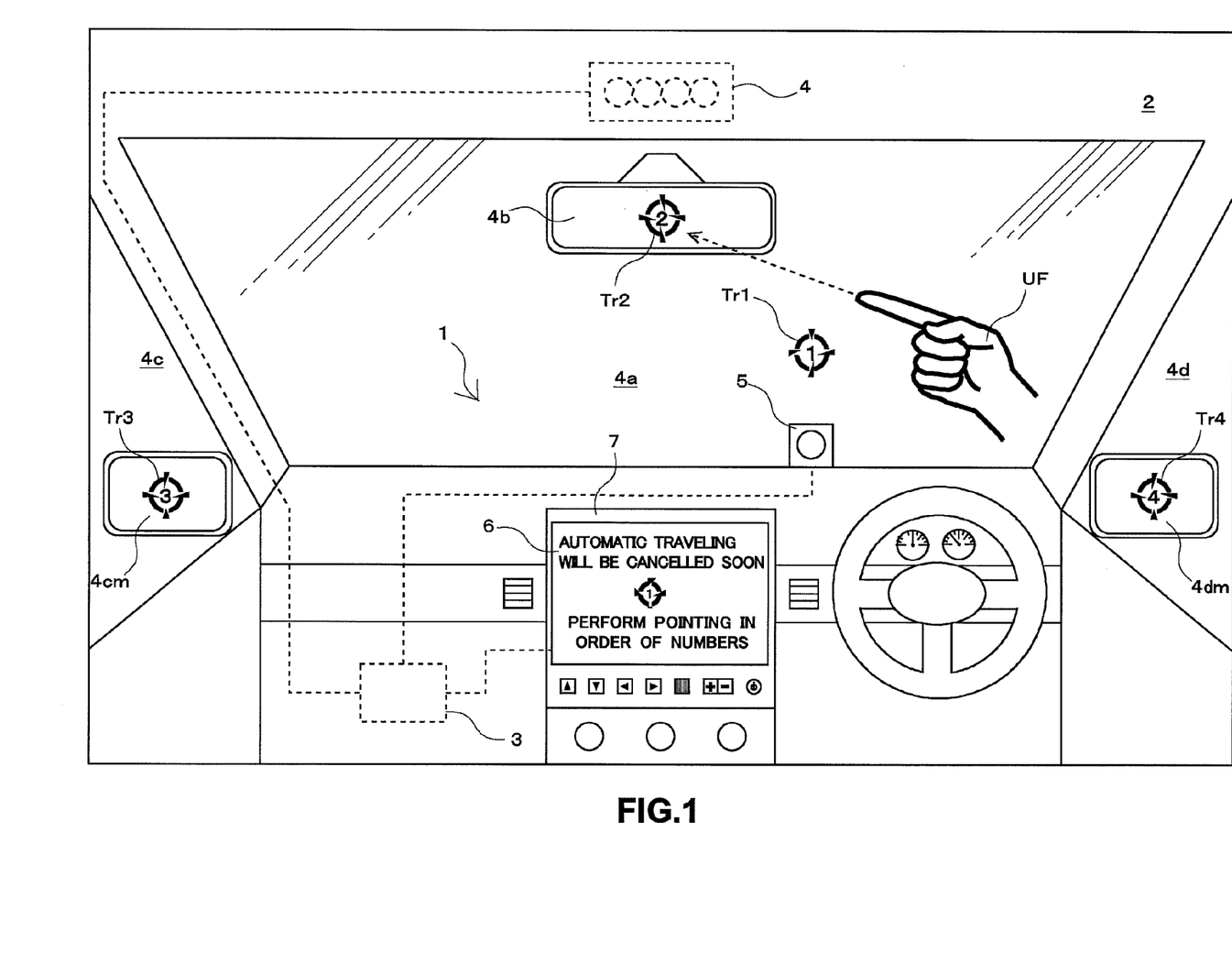
FIG. 1 shows an outline of a vehicle system according to a first embodiment.

FIG. 1 shows an outline of a vehicle system 1 according to the embodiment. The vehicle system 1 is mounted on a vehicle 2. The vehicle system 1 includes a vehicle control apparatus 3 and a projector 4.

The vehicle control apparatus 3 determines a travelling environment of the vehicle 2. The vehicle control apparatus 3 controls the projector 4 to project marks Tr1, Tr2, Tr3 and Tr4 for confirming the safety at positions inside the vehicle where the safety should be confirmed in accordance with the travelling environment. The positions inside the vehicle where the safety should be confirmed are a front window 4a, a room mirror 4b, a left-side window 4c and a right-side window 4d. The vehicle control apparatus 3 prompts a user (mainly a driver) to confirm the safety with respect to suitable positions inside the vehicle.

The travelling environment in which the marks are projected is an environment before autonomous travelling by using an autonomous travelling system (also called an autopilot system) which has been developing in recent years is switched to manual operation. For example, it is the environment before the vehicle enters a section where travelling roads with small radiuses of curvature (so-called sharp curves) continue and other environments. It is preferable to switch the operation from the autonomous travelling to the manual operation in such a section from the viewpoint of safety.

There is a danger that attention of the user with respect to safety confirmation is impaired when the user entrusts the operation to the autonomous travelling. Therefore, it is important to prompt the user to perform proper safety confirmation with respect to the vicinity of the vehicle before the autonomous travelling is switched to the manual operation. In particular, when cancelling an advanced autonomous travelling in which it is not necessary to grip a steering wheel, it is effective that the user performs safety confirmation by pointing to positions inside the vehicle where the safety should be confirmed, which is so-called pointing and calling. That is because the accuracy of confirmation is higher in the pointing and calling than in the confirmation only by visual check. Additionally, another travelling environment in which marks are projected corresponds to points where accidents frequently occur. The points where accidents frequently occur have factors of inducing accidents such as complicated land features or the traffic volume. Therefore, it is preferable that the user confirms the safety before the vehicle enters a point where accidents frequency occur even during the autonomous travelling.

The vehicle control apparatus 3 projects marks at positions where the safety should be confirmed before cancelling the autonomous travelling or before entering the point where accidents frequently occur to prompt the user to confirm the safety by pointing and calling. The vehicle control apparatus 3 detects the movement of pointing and calling by a camera 5, and cancels the autonomous travelling after reducing the speed of the vehicle 2 or expanding an inter-vehicle distance in the case where there is a possibility that the user has not confirmed the safety. Accordingly, the travelling safety of the vehicle 2 is maintained even when the autonomous travelling is cancelled or when the vehicle reaches the point where accidents frequency occur.

As the vehicle control apparatus 3 projects marks at positions where the safety confirmation should be performed in accordance with the travelling environment of the vehicle, it is possible to prompt the user to confirm the safety at suitable positions and at proper timing. Furthermore, as the vehicle control apparatus 3 controls the vehicle 2 based on the behavior of the user with respect to the projected marks, the vehicle 2 can travel safely.

Figure 2:
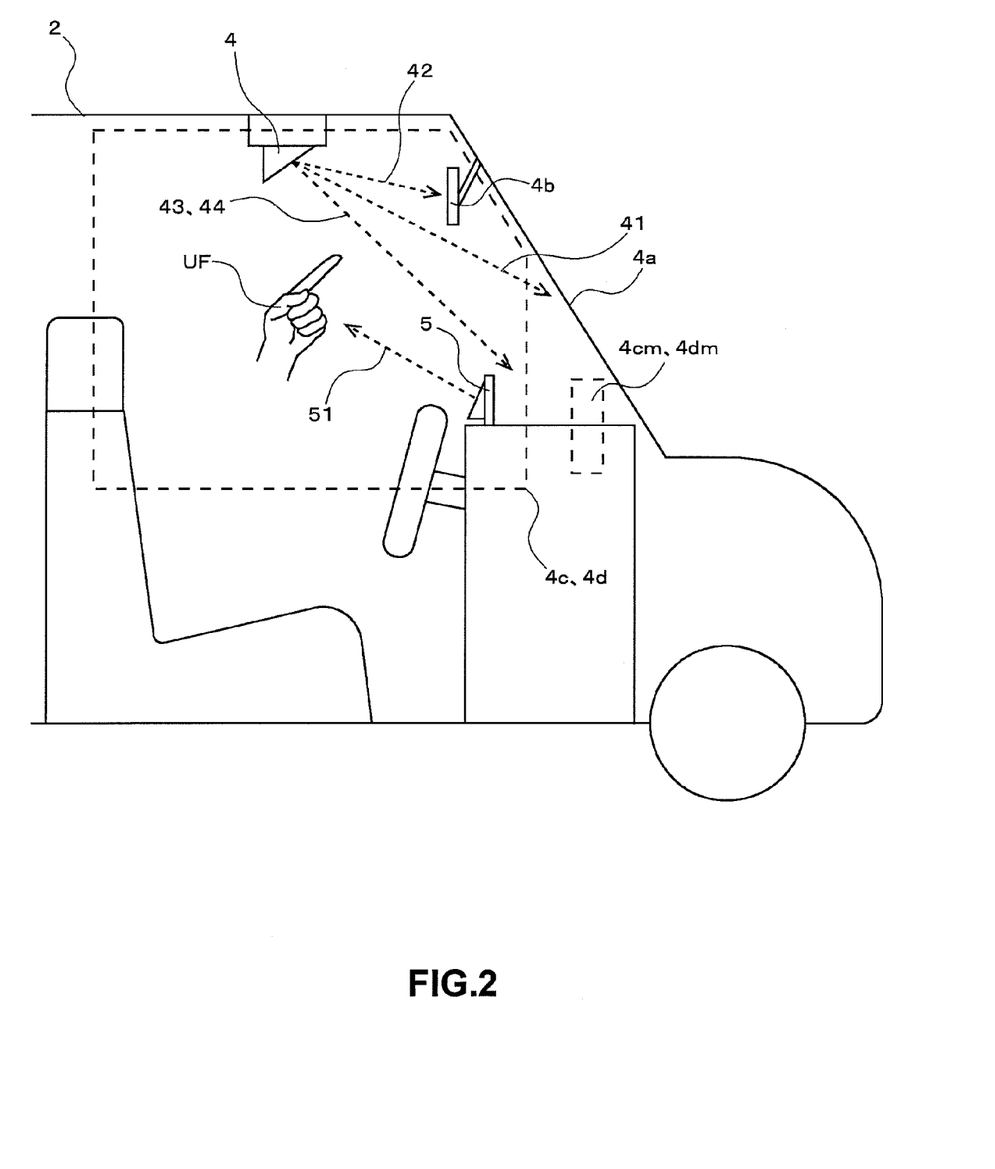
FIG. 2 is a view for explaining the arrangement of a projector and a camera inside the vehicle.

The arrangement of the projector 4 and the camera 5 inside the vehicle 2 will be explained. FIG. 2 shows the arrangement of the projector 4 and the camera 5 inside the vehicle 2. FIG. 2 shows a cross section of the front part of the vehicle 2.

The projector 4 is arranged in the vicinity of the center of a ceiling of the vehicle 2. The projector 4 includes light sources for radiating laser beams. A laser beam 41 radiated from the projector 4 projects the mark Tr1 on the front window 4a. A laser beam 42 projects the mark Tr2 on the room mirror 4b. Laser beams 43 and 44 project the mark Tr3 and the mark Tr4 on the left-side window 4c and the right-side window 4d overlapping a left-side mirror 4cm and a right-side mirror 4dm seen from the user seated on a driver's seat.

Screens for projection are adhered to the front window 4a, the room mirror 4b, the left-side mirror 4cm and the right-side mirror 4dm. On the screens for projection, respective marks are visually projected when the laser beams are radiated from the projector 4.

The following processing is performed for convenience of explanation by using the cross section of the vehicle 2. An arrow line of the laser beams 43 and 44 is shown in an overlapped manner. A frame line showing the left-side mirror 4cm and the right-side mirror 4dm is also shown in the overlapped manner. A frame line showing the left-side window 4c and the right-side window 4d is also shown in the overlapped manner.

The camera 5 is installed on a dashboard of the vehicle 2. An optical axis 51 of the camera 5 is directed to the user. An image-taking range of the camera 5 includes fingers UF of the user.

1-2. Configuration

Figure 3:
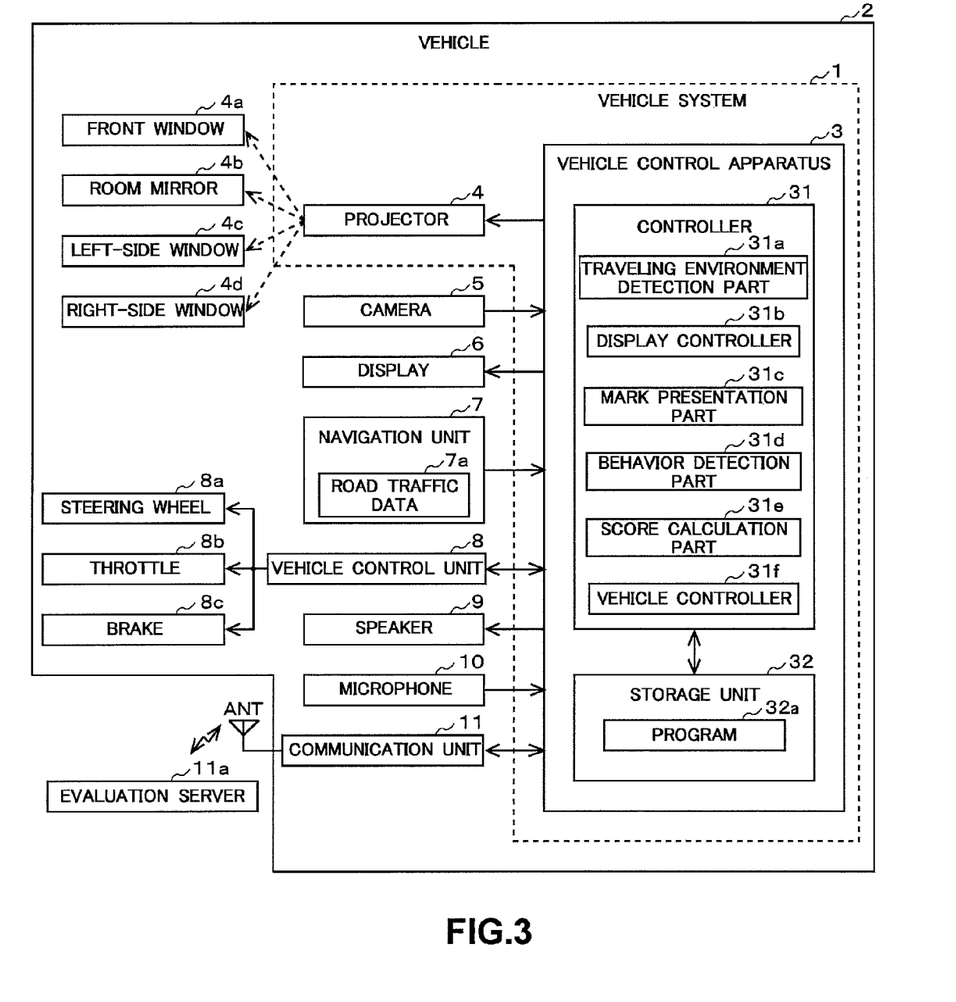
FIG. 3 shows a configuration of the vehicle system according to the first embodiment.

FIG. 3 shows a configuration of the vehicle system 1. The vehicle system 1 includes the vehicle control apparatus 3 and the projector 4 arranged in the vehicle 2.

The vehicle control apparatus 3 is arranged in the vehicle 2. The vehicle control apparatus 3 is an electronic control device controlled by a microcomputer. The vehicle control apparatus 3 determines the travelling environment of the vehicle 2 and projects marks for safety confirmation at the front window and so on in accordance with the travelling environment. The vehicle control apparatus 3 includes a controller 31 and a storage unit 32. The vehicle control apparatus 3 is connected to the camera 5, a display 6, a navigation unit 7, a vehicle control unit 8, a speaker 9, a microphone 10 and a communication unit 11 which are arranged in respective positions of the vehicle 2.

The controller 31 is a microcomputer including a CPU, a RAM and a ROM. The controller 31 is connected to the storage unit 32 included in the vehicle control apparatus 3. The controller 31 controls the entire device. Functions of the controller 31 will be described later.

The storage unit 32 is a storage medium storing data. For example, the storage unit 32 is a nonvolatile memory such as an EEPRO (Electrical Erasable Programmable Read-Only memory), a flash memory and a hard disk drive having a magnetic disc. The storage unit 32 store a program 32a.

The program 32a is read out by the controller 31. The program 32a is firmware executed for controlling the vehicle control apparatus 3 by the controller 31.

The projector 4 radiates laser beams to positions in the vehicle where the safety should be confirmed and projects (presents) marks. The number of light sources included in the projector 4 corresponds to the number of positions in the vehicle where the safety should be confirmed to which the laser beams are radiated. Respective light sources are arranged toward directions to which respective laser beams are radiated.

The positions inside the vehicle where the safety should be confirmed are preferably in the front window, the side windows and the room mirror to which films for projection are adhered thereinside. The marks preferably have shapes in which central points are clear, such as circles and squares. That is because the user can easily point to the marks.

The camera 5 is installed on the dashboard. The camera 5 mainly takes an image of an upper body of the user. The camera 5 transmits the taken video data to the controller 31. The image taking range of the camera 5 includes the movement of pointing and calling by the user. The video data is analyzed by the controller 31. When the video data is analyzed by the controller 31, a position of the user's hand and a direction pointed by a finger are detected. Well-known methods such as pattern matching are used for analysis.

On the display 6, various information such as characters and figures are displayed. The display 6 is a display device for visually presenting information to the user of the vehicle control apparatus 3. The display 6 is, for example, a liquid crystal display or an organic EL display.

The navigation unit 7 detects the current position of the vehicle 2 by using a navigation satellite system. The navigation unit 7 guides a route to a destination based on a later-described road traffic data 7a and a not-shown map data.

The road traffic data 7a is a data table including road conditions and road characteristics. The road conditions include states that the road is under construction, the road is closed, the road is covered with water, a tire chains are necessary and so on. The road characteristics includes characteristics such as a crossing of a complicated shape, entrance/exit of an expressway, a place where the autonomous travelling should be cancelled, a point where accidents frequently occur and so on. The navigation unit 7 assists the operation by presenting the road traffic data 7a to the user with map data. The navigation unit 7 transmits the road traffic data 7a of a road on which the vehicle 2 travels to the controller 31, which gives a chance for prompting the user to confirm the safety. The road traffic data 7a is constantly updated to the latest data by a road traffic information communication system (Vehicle Information and Communication system; abbreviated to VICS), a data update service by a manufacturer of the navigation unit 7 and so on.

The vehicle control unit 8 controls a steering wheel 8, a throttle 8b and a brake 8c provided in the vehicle 2. The vehicle control unit 8 is a device for realizing autonomous travelling by executing Adaptive Cruise Control (abbreviated to ACC) and Lane Keeping Assist (abbreviated to LKA).

The steering wheel 8 is a steering device for changing a travelling direction of the vehicle 2.

The throttle 8b is a speed increasing device for accelerating the vehicle 2 by controlling an engine.

The brake 8c is a braking device for reducing speed of the vehicle 2. The steering wheel 8a, the throttle 8b and the brake 2 are electronically controlled.

The ACC detects a preceding vehicle by a not-shown on-vehicle radar and controls the throttle 8b and the brake 8c so as to maintain a constant inter-vehicle distance with respect to the preceding vehicle. LKA detects a traffic lane by a not-shown on-vehicle camera and controls the steering wheel 8a so that the vehicle 2 does not depart from the lane. The autonomous travelling includes not only functions of assisting driving operations such as ACC and LKA but also an autonomous operation system not requiring driving operations by the user.

The speaker 9 outputs the sound to inform the user of sound information.

The microphone 10 collects the sound such as the voice of the user in the vehicle 2 and the sound around the vehicle control apparatus 3. The microphone 10 transmits the sound information obtained by collecting the sound to the controller 31. It is preferable that the microphone 10 has unidirectional characteristics. That is for preventing collection of unnecessary noise on roads outside the vehicle 2.

The communication unit 11 has an antenna, performing wireless communication with a later-described evaluation server 11a existing outside the vehicle 2 through a network. The communication unit 11 performs communication with the evaluation server 11a by using techniques of information communication such as WiMAX (Worldwide Interoperability for Microwave Access), and LTE (Long Term Evolution).

The evaluation server 11a is an information server installed outside the vehicle 2. The evaluation server 11a collects scores obtained based on the safety confirmation from users, ranking respective users based on scores. After the evaluation server 11a ranks the users, the evaluation server 11a transmits ranking data to respective users. The evaluation server 11a may rank users according to the travel distance. For example, the evaluation server 11a may rank users in a rank in which the travel distance is 500 km or less, a rank in which the travel distance is 501 km to 1000 km and a rank in which the travel distance is 1001 km or more.

The functions of the above-described controller 31 will be explained. The controller 31 includes a travelling environment detection part 31a functioning as a detector, a display controller 31b, a mark presentation part 31c functioning as a presentation part, a behavior detection part 31d functioning as a detector, a score calculation part 31e functioning as a controller and a vehicle controller 31f.

The travelling environment detection part 31a detects an environment in which the vehicle 2 travels. The travelling environment detection part 31a detects whether the road on which the vehicle travels is an expressway or an ordinary road, whether a crossing is closed, whether the vehicle approaches or reaches a point where the autonomous travelling is cancelled and whether the vehicle approaches or passes a point where accidents frequently occur. The travelling environment detection part 31a detects the environment in which the vehicle 2 travels based on road traffic data transmitted from the navigation unit 7. The travelling environment detection part 31a may detect the travelling environment by inter-vehicle communication. The travelling environment detection part 31a may detect the environment in which the vehicle 2 travels by a transmission device of traffic information installed on the road. The travelling environment detection part 31a can use, for example, the above-described VICS.

The display controller 31b generates an image to be displayed on the display 6 and displays the generated image on the display 6.

The mark presentation part 31c outputs a display signal to the projector 4 that is a display device to instruct the projector 4 to display marks inside the vehicle 2. The mark presentation part 31c presents marks inside the vehicle 2.

The behavior detection part 31d detects a movement of safety confirmation by the user based on video data from the camera 5. The well-known pattern matching method is used as the method of detecting the movement of safety confirmation. In the pattern matching method, a pattern image of fingers is obtained in advance when the user performs pointing and calling, and the video data from the camera 5 is checked with the pattern image to thereby detect a position and an angle of fingers of the user.

The score calculation part 31e counts the score with respect to the movement of safety confirmation by the user based on a detected result of the behavior detection part 31d. For example, the score calculation part 31e scores full points on a mark when an extended line of a finger tip of the user points to the center of the mark for a given period of time. The score calculation part 31e deducts points from the full points depending on a ratio in which extended line of the finger tip is deviated from the center of the mark and a ratio in which the pointing time is deviated from the given period of time. The given period of time is, for example, 1 second. The score calculation part 31e gives 10 points to the movement of safety confirmation by the user when full points have been obtained with respect to all marks.

The vehicle controller 31f controls the vehicle control unit 8 to execute the following control. The control executed by the vehicle controller 31f includes setting and cancelling of an autonomous travelling mode, increase and reduction of vehicle speed and expansion and contraction of the inter-vehicle distance with respect to the preceding vehicle.

1-3. Processing

Figure 4:
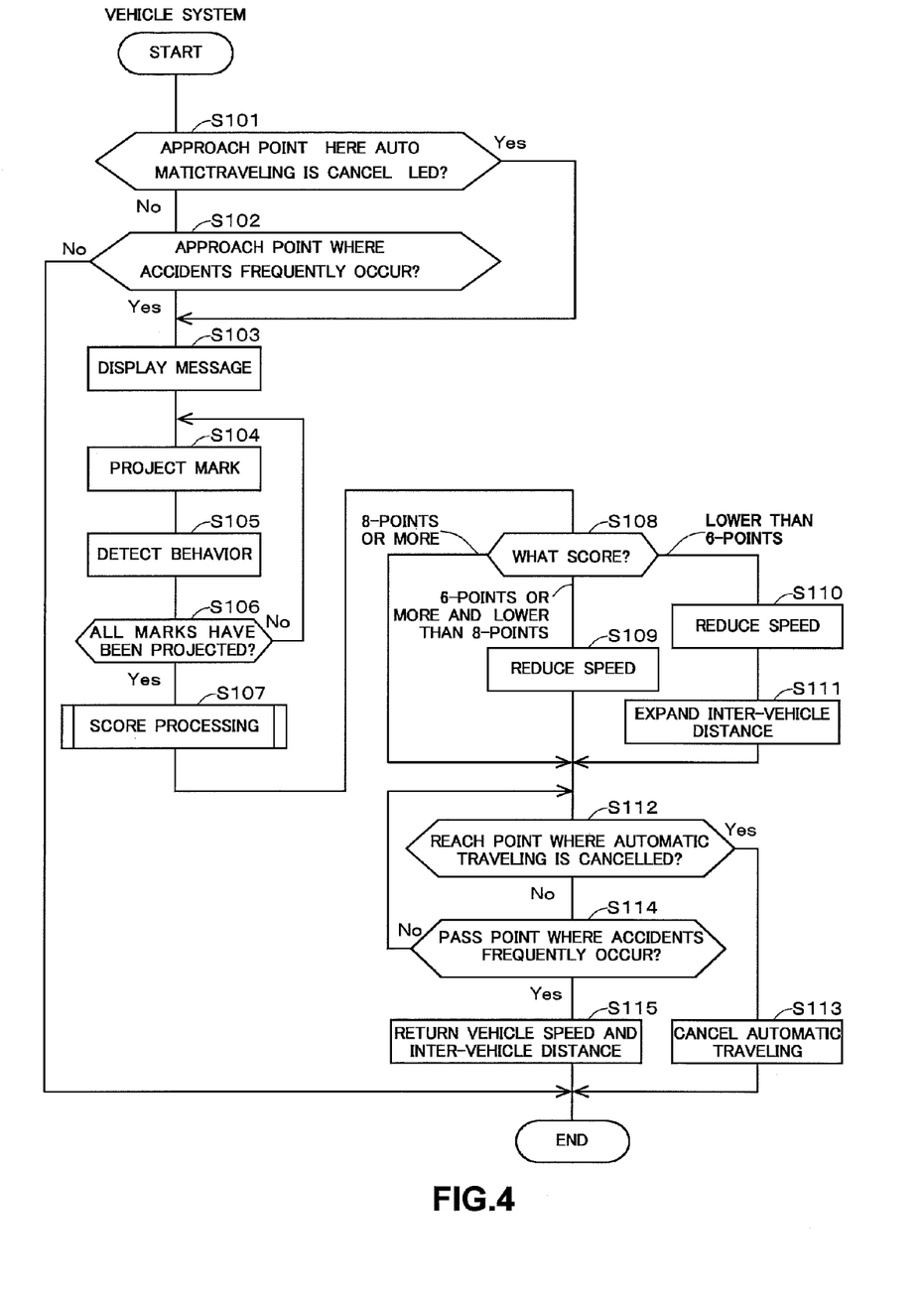
FIG. 4 shows processing procedures of the vehicle system according to the first embodiment.
Figure 5:
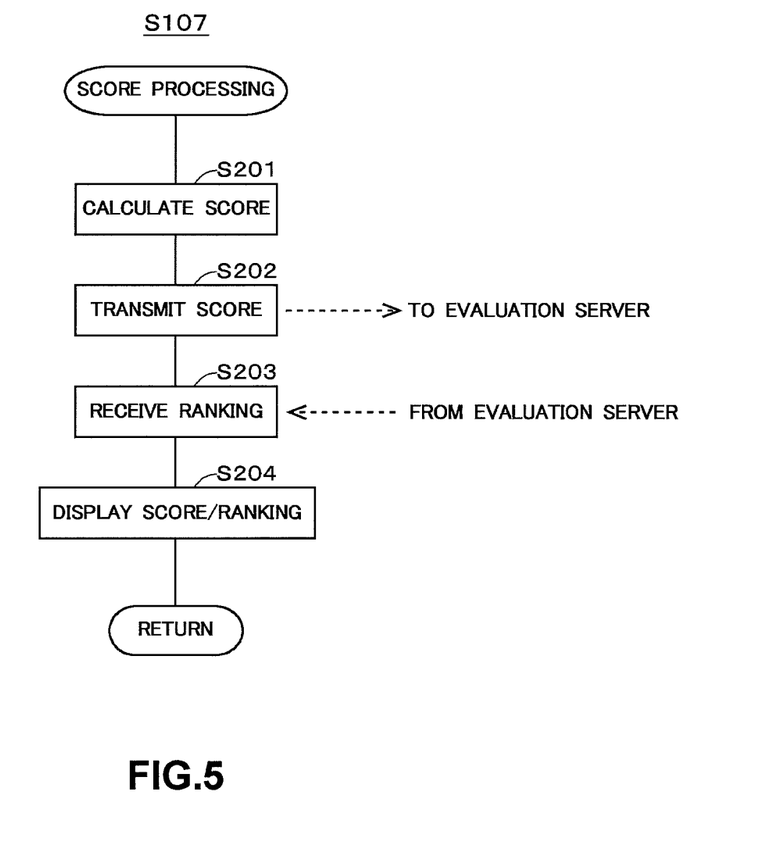
FIG. 5 shows processing procedures of the vehicle system according to the first embodiment.

Processing procedures of the vehicle system 1 will be explained. FIG. 4 and FIG. 5 show processing procedures of the vehicle system 1. The processing is executed in a given cycle repeatedly.

First, the travelling environment detection part 31a of the controller 31 determines whether the vehicle 2 approaches the point where autonomous travelling is cancelled or not based on the road traffic data 7a transmitted from the navigation unit 7 (Step S101).

When the travelling environment detection part 31a determines that the vehicle 2 approaches the point where autonomous travelling is cancelled (Yes in Step S101), the display controller 31b displays a message on the display 6 (Step S103). The message says, for example, "The autonomous travelling will be cancelled soon. Perform pointing and calling in order of numbers".

On the other hand, when the travelling environment detection part 31a determines that the vehicle 2 does not approach the point where autonomous travelling is cancelled (No in Step S101), the travelling environment detection part 31a determines whether the vehicle 2 approaches the point where accidents frequently occur or not based on the road traffic data 7a transmitted from the navigation unit 7 (Step S102).

When the travelling environment detection part 31a determines that the vehicle 2 approaches the point where accidents frequently occur (Yes in Step S102), the display controller 31b displays a message on the display 6 (Step S103). The message displayed in this case says, for example, "the vehicle enters the point where accidents frequently occur soon. Perform pointing and calling in order of numbers".

On the other hand, when the travelling environment detection part 31a determines that the vehicle 2 does not approach the point where accidents frequently occur (No in Step S102), the process ends. That is because it is not necessary to project marks for safety confirmation when the vehicle 2 does not approach either the point where autonomous travelling is cancelled or the point where accidents frequently occur. Accordingly, the process continues when the vehicle 2 approaches any of the point where autonomous travelling is cancelled and the point where accidents frequently occur (Yes in Step S101 and Yes in Step S102).

After the display controller 31b displays the message on the display 6, the mark presentation part 31c controls the projector 4 to project the mark Tr1 on the front window 4a (Step S104).

When the mark presentation part 31c projects the mark Tr1 on the front window 4a, the behavior detection part 31d detects the behavior of the user, namely, the movement of safety confirmation (Step S105).

It is also preferable to generate voices such as "front OK" and "left OK" from the speaker 9 when the display controller 31b detects the movement of safety confirmation by the user. In this case, as the user can confirm the safety not only by the movement of himself/herself but also by the voice, the same effects as in the case where the so-called pointing and calling is performed can be obtained. That is, the level of awareness with respect to safety confirmation can be increased, check omission can be reduced and the effects of pointing and calling can be improved.

Next, the mark presentation part 31c determines whether the marks have been projected at all positions where the safety should be confirmed inside the vehicle 2 or not (Step S106). The positions where the safety should be confirmed inside the vehicle 2 correspond to the front window 4a, the room mirror 4b, the left-side window 4c and the right-side window 4d. The mark presentation part 31c sequentially projects marks at equal temporal intervals at respective positions. The internal of projection is, for example, two seconds. That is, after the mark Tr1 is projected for two seconds, the projection of the mark is ended and the projection of the mark Tr2 is started. The mark presentation part 31c performs the start and the end of the projection of marks sequentially from the marks Tr1 to Tr4.

When the mark presentation part 31c determines that the marks have not been projected at all positions where safety confirmation should be performed inside the vehicle 2 (No in Step S106), the projection of a subsequent mark is performed (Step S104). The processes from Step S104 and S106 are repeatedly executed until the mark presentation part 31c determines that the marks have been projected at all positions where the safety should be confirmed inside the vehicle 2, namely, until mark presentation part 31c determines that the marks Tr1 to Tr4 have been all projected.

On the other hand, when the mark presentation part 31c determines that the marks have been projected at all positions where the safety should be confirmed inside the vehicle 2 (Yes in Step S106), the score calculation part 31e performs score processing of counting the score with respect to the safety confirmation by the user (Step S107). The detailed contents of execution of score processing will be described later.

After the score calculation part 31e performs score processing, the score calculation part 31e determines what score has been calculated (Step S108).

When the score calculation part 31e determines that the score is 8 points or more (8 points or more in Step S108), the process executes Step S112.

On the other hand, when the score calculation part 31e determines that the score is 6 points or more and lower than 8 points (6 points or more and lower than 8 points in Step S108), the vehicle controller 31f controls the vehicle control unit 8 to reduce the speed of the vehicle (Step S109). As the score of 6 points or more and lower than 8 points is not so high, there is a possibility that the user has not performed safety confirmation. Accordingly, it is possible to maintain the safety of travelling by reducing the speed of the vehicle 2.

The speed to be reduced may be determined depending on a speed limit or the traffic volume. For example, in the case where the vehicle travels at the speed limit, the speed is reduced by 20% as compared with the speed limit, and in the case where the traffic is heavy, the speed is reduced by 30% as compared with the speed limit.

Furthermore, when the score calculation part 31e determines that the score is lower than 6 points (lower than 6 points in Step S108), the vehicle controller 31f controls the vehicle control unit 8 to reduce the speed of the vehicle (Step S110) and to expand the inter-vehicle distance with respect to the preceding vehicle (Step S111). As the score lower than 6 points is a low score, and there is a high possibility that the user has not performed safety confirmation. Accordingly, it is possible to maintain the safety of travelling not only by reducing the speed of the vehicle 2 but also by expanding the inter-vehicle distance with respect to the preceding vehicle.

The speed to be reduced may be determined in the same manner as the process of Step S109. The inter-vehicle distance to be expanded with respect to the preceding vehicle may be determined depending on the type of the road on which the vehicle travels or the traffic volume. For example, in the case where the vehicle travels on the expressway, the inter-vehicle distance is increased by 20% as compared with the timing when the score is determined, and in the case where the traffic is heavy, the inter-vehicle distance is increased by 30% as compared with the timing when the score is determined.

Subsequently, the travelling environment detection part 31a determines whether the vehicle 2 reaches the point where autonomous travelling is cancelled or not (Step S112).

When the travelling environment detection part 31a determines that the vehicle 2 reaches the point where autonomous travelling is cancelled (Yes in Step S112), the vehicle controller 31d cancels autonomous travelling (Step S113). That is, ACC and LKA which have been set are cancelled, and driving operations of the vehicle 2 are left to the user. When the vehicle controller 31d cancels autonomous travelling, the process ends.

On the other hand, when the travelling environment detection part 31a determines that the vehicle 2 does not reach the point where autonomous travelling is cancelled (No in Step S112), the travelling environment detection part 31a determines whether the vehicle 2 has passed the point where accidents frequently occur or not (Step S114).

When the travelling environment detection part 31a determines that the vehicle 2 has passed the point where accidents frequently occur (Yes in Step S114), the travelling environment detection part 31a returns the vehicle speed which has been reduced and the inter-vehicle distance which has been expanded to those at the time of score processing (Step S115). That is, the vehicle speed and the inter-vehicle distance are returned to levels before being reduced and expanded. The autonomous travelling is continued. That is because the vehicle has passed the point where accidents frequently occur, not reaching the point where autonomous travelling is cancelled. In the case where the reduction of speed or the expansion of the inter-vehicle distance based on scores are not performed, the vehicle speed and the inter-vehicle distance are maintained. When the vehicle speed and the inter-vehicle distance are returned, the process ends.

When it is determined that the vehicle 2 approaches the point where autonomous travelling is cancelled in Step S101 (Yes in Step S101), it is not determined that the vehicle has passed the point where accidents frequently occur in Step S114 (Yes in Step S114). When it is determined that the vehicle 2 approaches the point where accidents frequently occur in Step S102 (Yes in Step S102), it is not determined that the vehicle 2 reaches the point where autonomous travelling is cancelled in Step S112 (Yes in Step S112). Because the process continues to Step S112 and Step S114 after the determination that the vehicle 2 approaches any of the point where autonomous travelling is cancelled or the point where accidents frequently occur.

Next, the details of score processing in which the score of safety confirmation by the user is counted in Step S107 will be explained. FIG. 5 shows the details of the score processing.

First, the score calculation part 31e calculates the score of safety confirmation by the user by using the above method (Step S201).

After the score calculation part 31e calculates the score, the score calculation part 31e transmits the calculated score to the evaluation server 11a through the communication unit 11 (Step S202).

After the score calculation part 31e transmits the calculated scored to the evaluation server 11a, the score calculation part 31e receives ranking information returned from the evaluation server 11a (Step S203).

The score calculation part 31e displays the calculated score and the ranking received from the evaluation server 11a on the display 6 (Step S204).

When the score calculation part 31e displays the calculated score and the ranking on the display 6, the process returns to the processes of FIG. 4. That is, the processes from Step S108 of FIG. 4 are executed.

Figure 6:
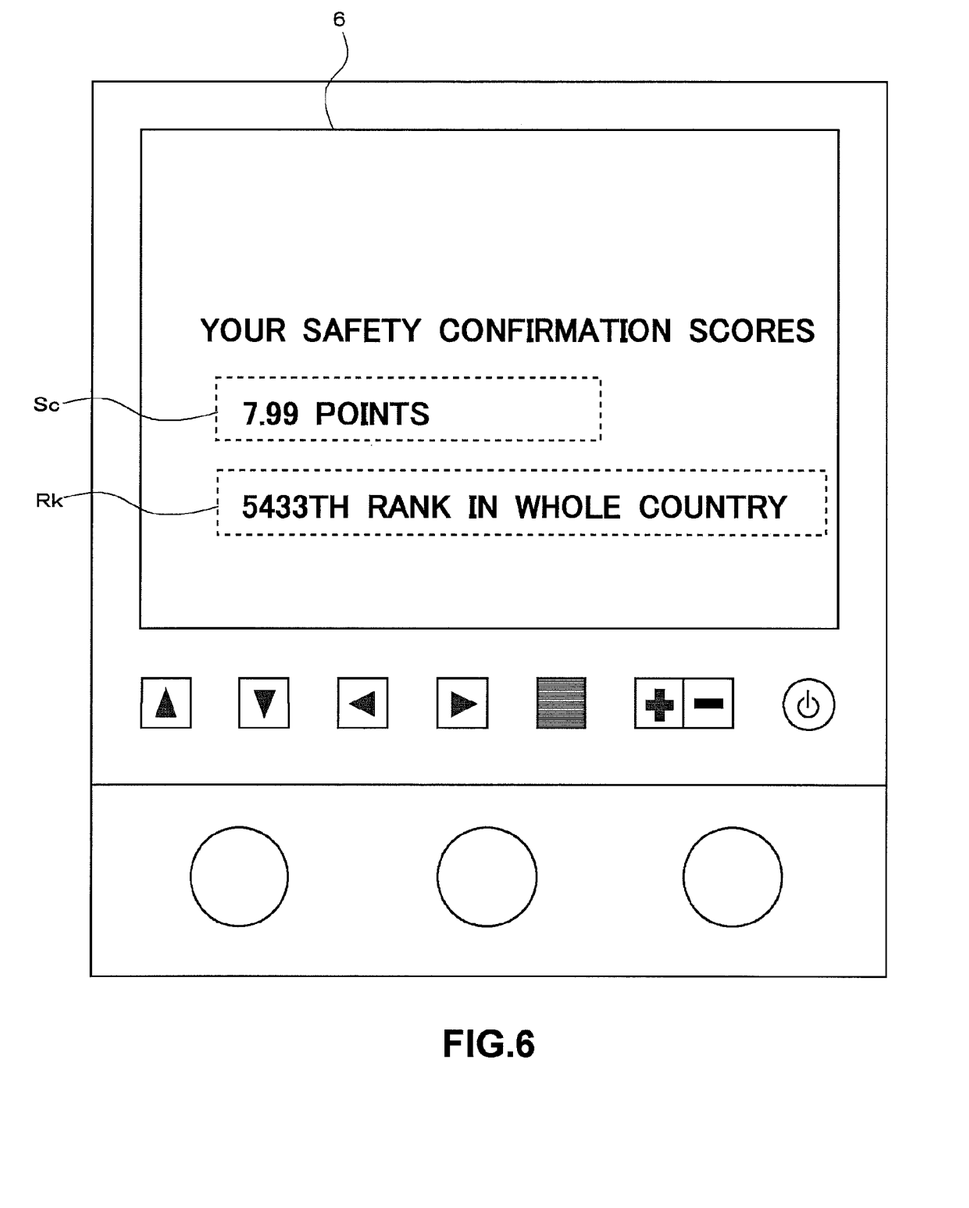
FIG. 6 is a display example of a score and a ranking displayed on a display.

Next, a display example of the score and the ranking in Step S204 of FIG. 5 will be explained. FIG. 6 is a display example of the score and the ranking displayed on the display 6.

A score message Sc indicating the score obtained by the movement of safety confirmation by the user and a ranking message Rk indicating the ranking based on the score are displayed on the display 6.

The score message Sc says, for example, "the score is 7.99 points". The score message Sc is created based on the score calculated by the score calculation part 31e.

The ranking message Rk says, for example, "5433th rank in the whole country". The ranking message Rk is created based on raking data transmitted from the evaluation server 11a.

The user can recognize the quality of safety confirmation of himself/herself by referring to the score message Sc, which can be used for reflecting on the movement of safety confirmation of this time and for improving the movement of safety confirmation of next time.

The user can compare the quality of safety confirmation of himself/herself with those of others by referring to the ranking message Rk, which encourages the user to improve the movement of safety confirmation of next time.

As described above, the vehicle control apparatus 3 of the vehicle system 1 according to the embodiment detects the travelling environment of the vehicle 2 and presents marks at positions where the safety should be confirmed in the vehicle 2 in accordance with the travelling environment. Accordingly, it is possible to prompt the user to confirm the safety at suitable positions and at proper timing. The vehicle control apparatus 3 also detects the behavior of the user with respect to the presented marks and controls the vehicle 2 based on the behavior. In particular, when there is a possibility that the user does not confirm the safety, the vehicle speed is reduced or the inter-vehicle distance of the vehicle 2 is expanded. Accordingly, the vehicle 2 can travel safely.

The vehicle control apparatus 3 of the vehicle system 1 according to the embodiment presents marks when the autonomous travelling state is cancelled. Accordingly, it is possible to cancel the autonomous travelling safely even when the attention of the user with respect to safety confirmation is reduced during the autonomous travelling.

The vehicle control apparatus 3 of the vehicle system 1 according to the embodiment detects the movement of pointing and calling by the user as the behavior of the user with respect to the marks. Accordingly, it is possible to detect whether the user has performed positive safety confirmation or not, which leads to suitable control of the vehicle 2.

Additionally, the vehicle control apparatus 3 of the vehicle system 1 according to the embodiment sequentially presents marks at plural positions where the safety should be confirmed. Accordingly, it is possible to prompt the user to confirm the safety in the order suitable for the user as the marks are sequentially presented at positions where the safety should be confirmed.

Furthermore, the vehicle control apparatus 3 of the vehicle system 1 according to the embodiment presents marks at any of the front window, the side windows and the room mirror provided in the vehicle 2. Accordingly, it is possible to prompt the user to confirm the safety at suitable positions.

2. Modification Examples

The embodiment of the invention has been shown as described above. However, the invention is not limited to the above embodiment. The invention can be modified. Hereinafter, modification examples will be explained. The above and the following embodiments can be suitably combined.

In the above embodiment, the user controls the vehicle 2 based on the behavior of safety confirmation by the user. However, it is also possible not to control the vehicle 2. The confirmation can be performed at timings other than during autonomous travelling. That is because the user himself/herself can appropriately control the vehicle 2 by performing safety confirmation at suitable positions and at proper timing.

That is, it is preferable to project the marks for safety confirmation at suitable positions at suitable timing at the time of starting the vehicle 2 as well as during the travelling. Accordingly, there are advantages for assisting operation by beginners having little experience in driving and elderly persons having little judgment. The safety confirmation during manual operation should be performed visually instead of the pointing and calling in which it is necessary to release hands from the steering wheel. The proper timing includes: at the time of entering and exiting from the expressway, at the time of changing lanes, just before passing a crossing and so on. The suitable positions includes: the front window, side windows, the room mirror and so on inside the vehicle 2.

It is preferable that the projection of marks for safety confirmation is performed with notification to the user by voices. The notification by voice includes, for example, "Turn right at the crossing soon. Confirm the safety visually at positions of marks", "Confirm the safety in the following order: the front, the room mirror, the left-side window and the right-side window". In this case, the user can previously recognize that the marks are projected and can make a preparation of mind and body. As it is possible to prompt the user to confirm the safety at suitable positions and at proper timing, the user can grasp which position should be visually confirmed inside the vehicle 2 easily and does not hesitate to decide positions and the timing to be visually confirmed.

Another modification example will be shown. Although the fingers are analyzed by the camera 5 in the above embodiment, it is alto preferable to use a motion sensor. In this case, the trace and speed of movement of the fingers UF of the user can be detected, that is, the suitability of safety confirmation can be detected more specifically.

Although the marks are projected in order of numbers in the above embodiment, it is also preferable to project all marks at the same time.

Furthermore, the marks are projected on the windows or the mirror by the projector in the above embodiment, however, it is also preferable that a display function is added to the windows and the mirror and that the windows and the mirror display the marks. The marks may be presented to the user by projection, display and so on.

The positions where the safety should be confirmed in the vehicle 2 are the front window 4a, the room mirror 4b, the left-side window 4c and the right-side window 4d in the above embodiment, however, the invention is not limited to these positions. The position may be the display 6. The safety may be confirmed at the dashboard and a head-up display installed on the ceiling. A rear window may be added. The side mirror or obstacles existing outside the vehicle 2 may be targets. In short, positions inside and outside the vehicle 2 where the safety should be confirmed are included.

In the above explanation, the vehicle system 1 is mounted on vehicles in the embodiment, and vehicles include transport equipment such as a two-wheeled vehicle, a railway vehicle, an airplane and a ship in addition to the car. The vehicles also include military vehicles in addition to consumer vehicles and further include vehicles for business use in addition to vehicles for personal use. Additionally, the vehicle system 1 can be installed not only in vehicles but also in elevator machines such as an elevator and an escalator. In short, the vehicle system 1 may be installed in places where the safety confirmation is necessary.

While the invention has been shown and described in detail, the foregoing description is in all aspects illustrative and not restrictive. It is therefore understood that numerous other modifications and variations can be devised without departing from the scope of the invention.

What is claimed is:

1. A vehicle device which controls a vehicle travelling in an autonomous travelling mode, the vehicle device comprising:
   a controller configured to:
   determine that the vehicle is operating in the autonomous travelling mode in which the vehicle is allowed to autonomously travel;
   receive a signal indicative of a travelling environment of the vehicle, the travelling environment is a travelling environment in which the autonomous travelling of the vehicle is to be cancelled while the vehicle is operating in the autonomous travelling mode;
   output a display signal to a display device to instruct the display device to sequentially display at least one respective mark corresponding to at least one respective position inside the vehicle where a driver sequentially confirms safety, the display signal being output in accordance with the travelling environment;
   detect a behavior of the driver of the vehicle in response to the display of the at least one respective mark, the detected behavior of the driver is a movement of the driver pointing at the displayed at least one respective mark to confirm safety; and
   reduce a driving speed of the vehicle with a brake when a score value of the behavior of the driver does not exceed a predetermined quantitative threshold value calculated by the controller.

2. The vehicle device according to claim 1, wherein the controller instructs the display device to display the at least one respective mark at any of a front window, side windows and a room mirror provided in the vehicle.

3. The vehicle device according to claim 1, wherein the controller is further configured to reduce the speed of the vehicle when the detected behavior of the driver of the vehicle indicates that the driver is unaware of the displayed at least one respective mark.

4. The vehicle device according to claim 1, wherein
the signal indicative of the travelling environment of the vehicle is supplied to the controller from a vehicle navigation system that indicates a location of the vehicle.

5. The vehicle device according to claim 1, further comprising:
a projector, which is the display device, the projector being coupled to the controller and displaying sequentially the at least one respective mark corresponding to the at least one respective position inside the vehicle where the driver sequentially confirms safety.

6. The vehicle device according to claim 1, further comprising:
a camera that outputs an image of the driver of the vehicle to the controller, the controller detecting the behavior of the driver from the image output by the camera.

7. A method of controlling a vehicle travelling in an autonomous travelling mode by a vehicle controller, the method comprising:
(a) determining, by the vehicle controller, that the vehicle is operating in the autonomous travelling mode in which the vehicle is allowed to autonomously travel;
(b) detecting, by the vehicle controller, a travelling environment of the vehicle based on a received signal indicative of the travelling environment of the vehicle, the travelling environment is a travelling environment in which the autonomous travelling of the vehicle is to be cancelled while the vehicle is operating in the autonomous travelling mode;
(c) outputting, by the vehicle controller, a display signal to a display device to instruct the display device to sequentially display at least one respective mark corresponding to at least one respective position inside the vehicle where a driver sequentially confirms safety, the display signal being output in accordance with the travelling environment;
(d) detecting, by the vehicle controller, a behavior of the driver of the vehicle in response to the display of the at least one respective mark, the detected behavior of the driver is a movement of the driver pointing at the displayed at least one respective mark to confirm safety; and
(e) reducing, by the vehicle controller, a speed of the vehicle with a brake when a score value of the behavior of the driver does not exceed a predetermined quantitative threshold value calculated by the vehicle controller.

8. The method according to claim 7, wherein
the step (c) instructs the display device to display the at least one respective mark at any of a front window, side windows and a room mirror provided in the vehicle.

9. The method according to claim 7, wherein
the step (e) further comprising reducing the speed of the vehicle when the detected behavior of the driver of the vehicle indicates that the driver is unaware of the displayed at least one respective mark.

10. The method according to claim 7, wherein
the signal indicative of the travelling environment of the vehicle is supplied to the vehicle controller from a vehicle navigation system that indicates a location of the vehicle.

11. The method according to claim 7, wherein
the display device is a projector that is coupled to the vehicle controller and that displays sequentially the at least one respective mark corresponding to the at least one respective position inside the vehicle where the driver sequentially confirms safety.

12. The method according to claim 7, wherein
a camera outputs an image of the driver of the vehicle to the vehicle controller, the vehicle controller detecting the behavior of the driver from the image output by the camera.

\* \* \* \* \*